Aug. 29, 1967    J. MÜLLER    3,338,135
MILLING MACHINE
Filed Nov. 8, 1965    3 Sheets-Sheet 2

United States Patent Office 3,338,135
Patented Aug. 29, 1967

3,338,135
MILLING MACHINE
Johann Müller, Munich, Germany, assignor to Friedrich Deckel Prazisions Mechanik und Maschinenbau, Munich, Germany, a firm of Germany
Filed Nov. 8, 1965, Ser. No. 506,724
Claims priority, application Germany, Nov. 12, 1964, D 45,838
5 Claims. (Cl. 90—11)

This invention relates to a milling machine, and more particularly to an arrangement of counterstays or braces for the spindle head of the vertical spindle of a machine of the type having both a horizontal spindle and a vertical spindle.

An object of the invention is the provision of a generally improved and more satisfactory milling machine of the type having both a horizontal spindle and a vertical spindle.

Another object is the provision of such a milling machine having a simple and effective bracing means for holding the spindle head more securely and which, in so doing, enables the spindle stock of the horizontal spindle to be made higher and therefore more rigid than is the case when there is no such bracing means for the vertical spindle.

Still another object is the provision of a milling machine having simple and effective bracing means for bracing the lower end of the spindle head of a vertical spindle, thereby holding the lower end of such spindle head rigidly notwithstanding the fact that such spindle head may project downwardly a considerable distance from the spindle stock of the vertical spindle, thereby insuring that the extent of downward projection of the spindle head is no longer a limiting factor in the design of the milling machine.

These and other desirable objects may be attained in the manner disclosed as an illustrative embodiment of the invention in the following description and in the accompanying drawings forming a part hereof, in which.

Figure 1:
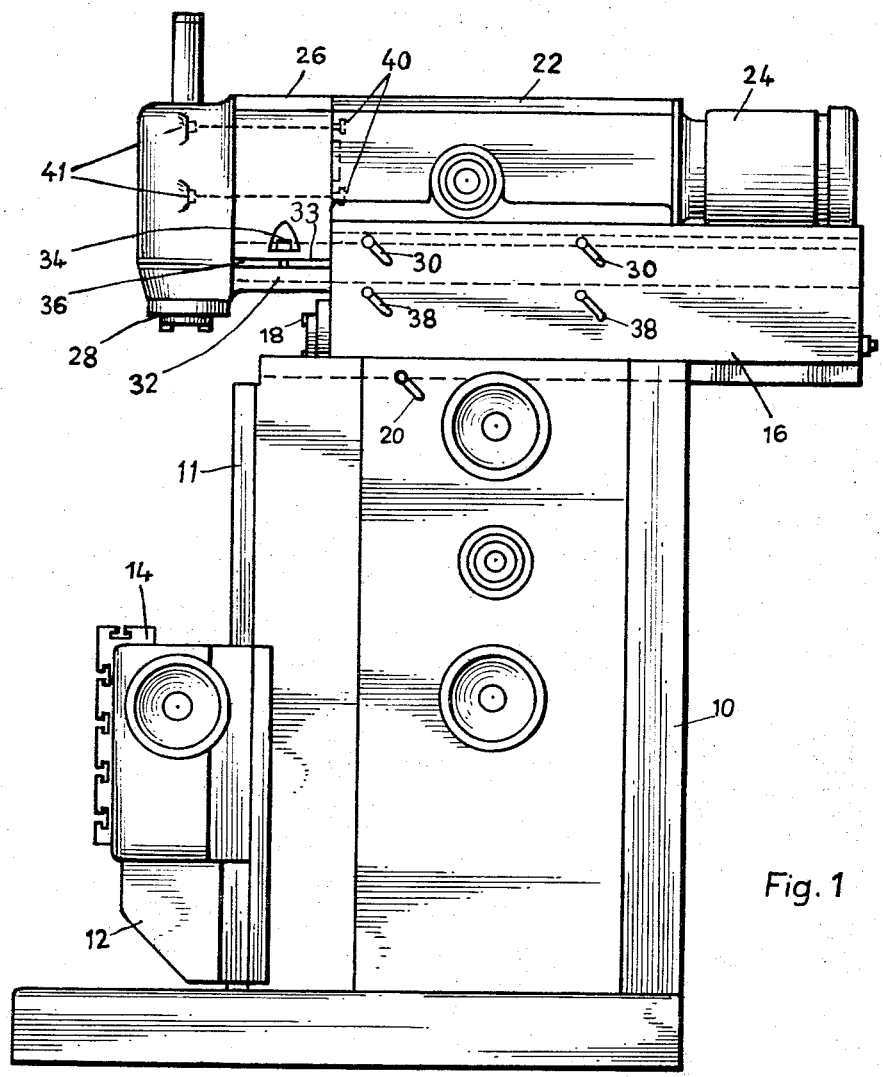
FIG. 1 is a side elevation of a universal milling machine of the type having a work table with a vertical work-clamping surface, showing the parts in one position.

It is already known in the art to provide a milling machine with both a vertical spindle and a horizontal spindle (such a machine being sometimes called a universal milling machine) wherein the vertical spindle is carried by a spindle stock which is movable along horizontal guideways on the support of the horizontal spindle. Sometimes the support of the horizontal spindle is a fixed part of the machine (e.g., Patents 1,976,107 and 3,018,698) and sometimes the support of the horizontal spindle is a spindle stock which is movable along horizontal guideways on a fixed part of the machine, in order to obtain greater working range (e.g., Patent 3,117,493). In either event, it is desirable that the lower end of the spindle head of the vertical spindle be relatively close to the elevation of the horizontal spindle, in order to take advantage of the same vertical working range when doing milling with either spindle.

If the lower end of the spindle head of the vertical spindle is close to the elevation of the horizontal spindle, this is likely to create difficulties. When the horizontal spindle is located in a horizontally movable spindle stock, in order to have greater working range, then the spindle stock must be made relatively low or thin in a vertical direction, in order that the spindle stock of the vertical spindle, carried on the top of the spindle stock of the horizontal spindle, can be kept as close as possible to the axis of rotation of the horizontal spindle. The low or thin spindle stock of the horizontal spindle then does not have the strength and rigidity which is desirable. On the other hand, when the spindle stock of the horizontal spindle is made higher or thicker in a vertical direction, to give it the desirable amount of strength and rigidity, this raises the overlying spindle stock of the vertical spindle so high that the spindle head of the vertical spindle must project downwardly to such a great extent (in order to get the lower end of such spindle head at approximately the elevation of the axis of the horizontal spindle) that the downwardly projecting part is subject to vibration and deflection, and does not have the strength and rigidity which is desirable. Thus there is a dilemma, in machines made according to the prior art, whether to sacrifice the desirable strength and rigidity of the spindle stock of the horizontal spindle, in order to provide the desired strength and rigidity of the spindle head for the vertical spindle, or whether to sacrifice the rigidity of the spindle head of the vertical spindle in order to achieve the desired rigidity of the spindle stock of the horizontal spindle. The present invention eliminates this dilemma entirely, by use of simple and effective counterstays or braces for the spindle head of the vertical spindle. This enables the spindle head of the vertical spindle to project downwardly below its supporting spindle stock, to a greater extent than would otherwise be permissible with regard to the desired rigidity, and so it enables the spindle stock of the vertical spindle to be placed at a higher elevation than would otherwise be permissible, thereby enabling the underlying spindle stock of the horizontal spindle to be higher or thicker in a vertical direction, to give it the desired rigidity. Various braces and counterstays have been used in the prior art (e.g., Swiss Patent 371,660, and FIGS. 2 and 3 of British Patent 793,209, and FIG. 7 of U.S. Patent 1,976,107) but these have been used only in connection with the horizontal spindle. So far as known at present, the prior art does not include any suggestion of such counterstays or braces for the spindle head of the vertical spindle of a universal milling machine, at least not for accomplishing the above mentioned results and overcoming the above mentioned difficulties.

Figure 2:
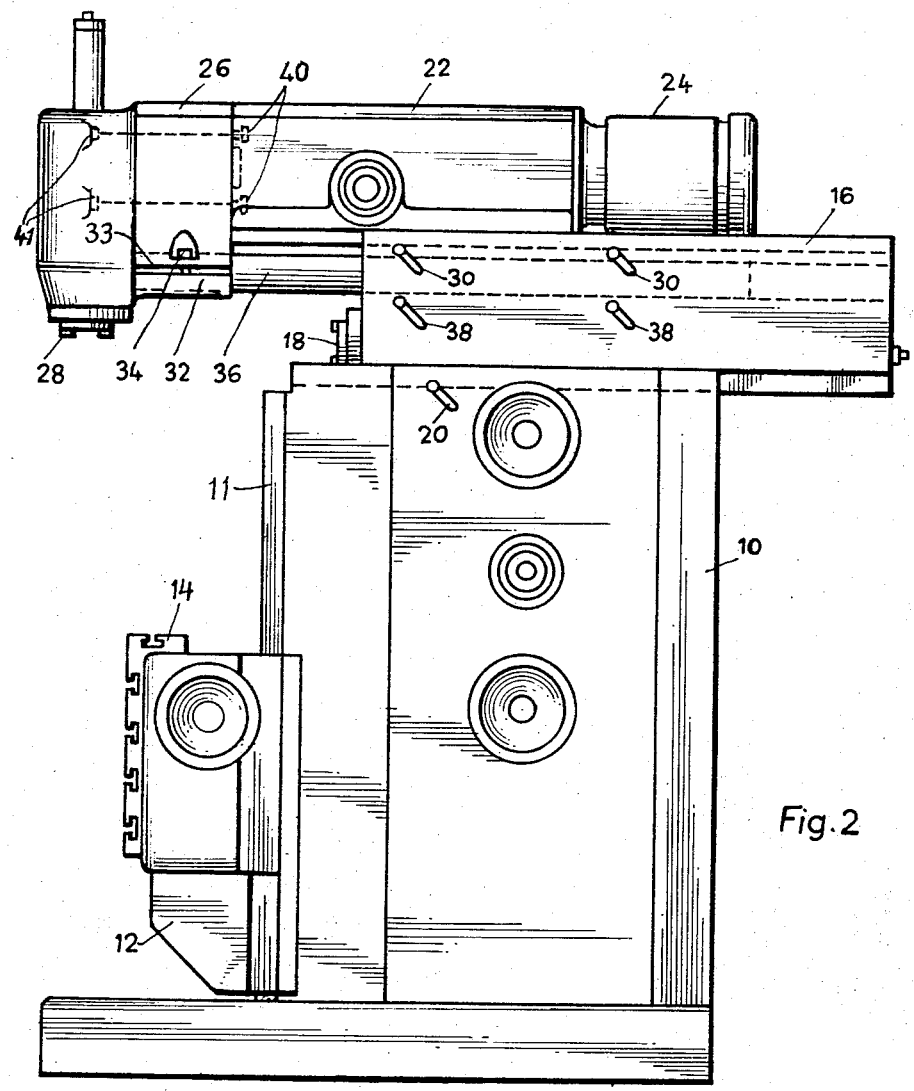
FIG. 2 is a similar view showing the parts in another position, with the vertical spindle head projected farther forwardly.

Referring now to the drawings, FIGS. 1 and 2 illustrate a preferred embodiment of the invention as applied to a universal milling machine of the type in which the main work-clamping surface of the work table is vertical rather than horizontal. The machine comprises a main column 10 having vertical guideways 11 on the front of the column, along which a bracket or knee 12 is vertically movable by conventional feeding or adjusting means. On the member 12 is the work table 14, horizontally movable by conventional feeding or adjusting means. As clearly seen in the drawings, the main work-clamping face of the table 14 is vertical.

On the top of the machine column 10, there is a spindle stock 16 supported in horizontal guideways for transverse horizontal movement in a direction at right angles to the direction of horizontal movement of the table 14. This spindle stock 16 carries the horizontal spindle 18. The spindle stock can be clamped fast to the machine column by the locking handle 20.

On the top of the spindle stock 16 of the horizontal spindle, there is another horizontal guideway running in the same direction as the guideway in which the spindle stock 16 is mounted. In this second horizontal guideway there is a spindle stock 22, carrying at its rear end a drive motor 24, and at its front end a spindle head 26 containing a vertical spindle 28. This second spindle stock 22 can be moved along its guideways on the top of the first spindle stock 16, parallel to the direction of movement of the first spindle stock and transverse to the direction of movement of the work table 14. The second spindle stock 22 can be clamped fast by means of locking handles 30. The adjustment of the bracket 12, of the table 14, and of the spindle stocks 16 and 22, as well as the drives of the spindles 18 and 28, all take place in a conventional manner, well known in the art, the details of which are not important for purposes of the present invention.

On the spindle head 26, near the bottom thereof, there are two extensions or bosses 32, one on each side. Each of these bosses contains a bore with its axis parallel to the direction of the guideway on which the spindle stock 22 slides, and each boss is longitudinally slotted as shown at 33, so that it may be slightly contracted by tightening the bolt 34, to clamp tightly on a counterstay or brace 36 which projects at its forward end into the bore in the boss, and extends rearwardly into a bore in the spindle stock 16 of the horizontal spindle 18. Each of these braces or counterstays 36 has a snug sliding fit in its respective bore in the spindle stock 16, and can be clamped fast therein by conventional clamp means operated by the locking levers 38. It will be noted that these braces 36 extend horizontally in laterally spaced relation to each other, on opposite sides of a vertical plane passing along the axis of rotation of the horizontal spindle 18. The braces are parallel to each other and to the axis of rotation of the spindle 18, and are at an elevation a little above the spindle 18 and below the guideway at the top of the spindle stock 16.

When the vertical spindle is moved forwardly from the rear position shown in FIG. 1 to a position such as shown in FIG. 2, for milling on a more forward part of the workpiece clamped on the table 14, the counterstays or braces 36 provide additional support for the spindle head 26 of the vertical spindle, giving it additional rigidity. These braces 36 are located fairly close to the lower end or "nose" of the vertical spindle housing, as clearly seen in FIGS. 1 and 2, and the support given by these counterstays 36 makes it immaterial that the spindle head may have a nose which projects downwardly a considerable extent below the lower face or guideway face of the spindle stock 22. The support provided by these braces 36 is considerably below the support provided by the screws or bolts 41 which mount the spindle head 26 from the usual conventional annular groove 40 formed at the front end of the spindle stock 22, this annular groove and the screws or bolts associated therewith being the sole customary means for supporting the vertical spindle head from its spindle stock in the customary construction heretofore used. But because of the extra support provided by the braces or counterstays 36 in the present construction, it does not matter to how great an extent the nose of the vertical spindle housing projects downwardly below the bottom of the spindle stock 22, and therefore the bottom of the spindle stock can be raised above the customary position, enabling the first spindle stock 16 to be made higher or thicker in a vertical direction, with added strength, and without disturbing the desired relationship that the lower end of the vertical spindle 28 is at approximately the same elevation as the horizontal spindle 18.

Figure 3:
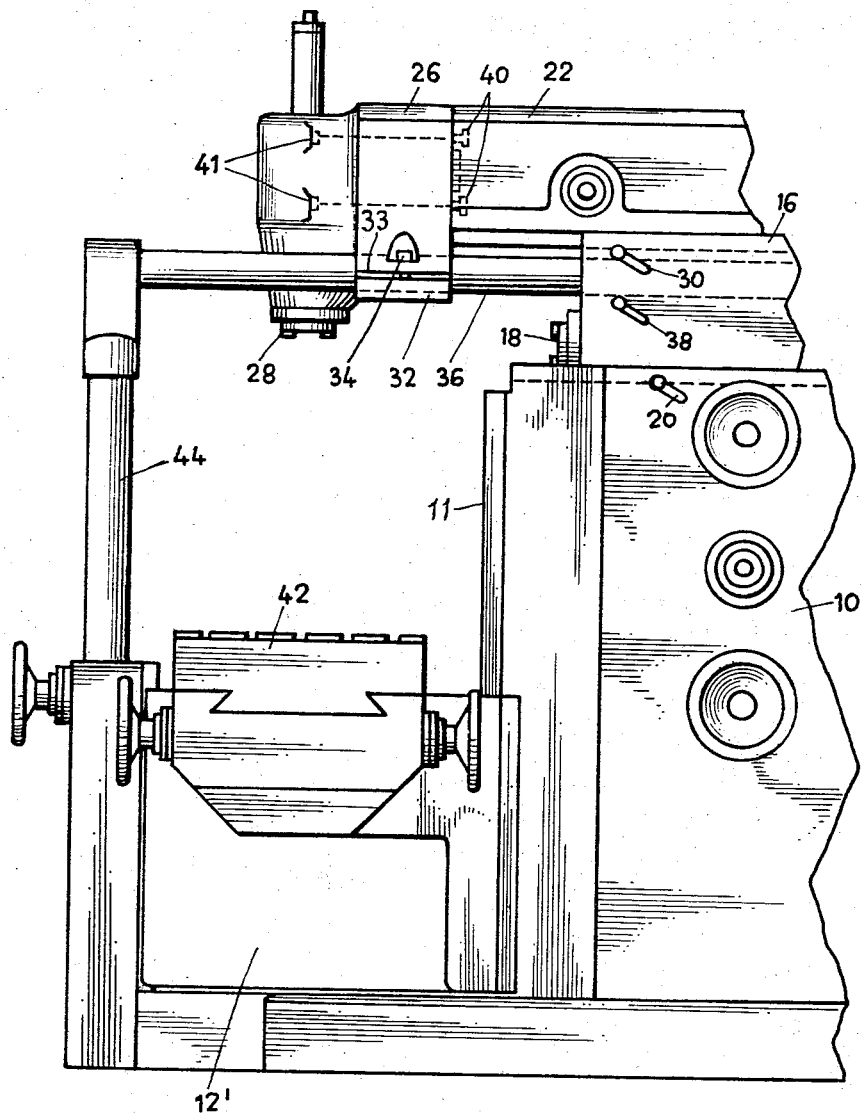
FIG. 3 is a similar side elevation showing the present invention applied to a different type of universal milling machine with a horizontal work-clamping table.

FIG. 3 shows how the present invention may be applied to a milling machine in which the work table has a horizontal work-clamping surface rather than a vertical work-clamping surface, or may be applied, indeed, to any milling machine in which it is desired to have a greater range of forward travel of the vertical spindle, than that provided by the construction shown in FIGS. 1 and 2. In FIG. 3, the work table 42, with horizontal work-clamping surface, is mounted on the bracket or knee 12' which, like the previous bracket 12, travels up and down the vertical guideways 11. In this construction, the counterstays or braces 36 are extended forwardly beyond the vertical spindle head 26, as well as extending rearwardly into the sockets or bores in the spindle stock 16. The forward ends of the braces 36 are secured to a prop or strut 44 of conventional design, similar to props or struts used heretofore for supporting the forward end or outboard end of a long horizontal spindle arbor. Except for the features above mentioned, the construction of the embodiment shown in FIG. 3 may be the same as that shown in FIGS. 1 and 2, and the same reference numerals are used for corresponding parts, no additional description thereof being necessary.

With this construction, the stability of the vertical spindle is independent of the extent of overhang or the amount by which the vertical spindle stock 22 is moved forwardly beyond the front end of the horizontal spindle stock 16. When milling is to be performed with the vertical spindle in a fixed location, the clamping screws 34 may be tightened to hold the vertical spindle tight on the braces 36, as well as having the braces 36 fastened tightly by means of the handles 38. However, if it is desired that the vertical spindle travel forwardly and rearwardly during the milling operation, the screws 34 may be loosened while the clamping handles 38 remain tight, and then the vertical spindle head 26 (with the stock 22, of course) can travel along the braces 36 during the operation, using them as rails, while the members 36 remain clamped fast by the clamps 38.

It is seen from the foregoing disclosures that the objects and purposes of the invention are well fulfilled. It is to be understood that the foregoing disclosure is given by way of illustrative example only, rather than by way of limitation, and that without departing from the invention, the details may be varied within the scope of the appended claims.

What is claimed is:

1. A milling machine comprising means forming a support for a horizontal spindle, a vertical spindle stock mounted on and displaceable horizontally on said support for said horizontal spindle, and a vertical spindle head mounted on said vertical spindle stock, characterized by the fact that said support for said horizontal spindle has means for holding two brace members in positions projecting horizontally from said support at an elevation about that of said horizontal spindle, and by the fact that said spindle head extends downwardly into the region of said brace members and has means for connecting with said brace members so that said brace members help to stabilize said spindle head.

2. A construction as defined in claim 1, further characterized by the fact that said means for connection with said brace members includes lateral extensions on said vertical spindle head, which extensions are so formed that they may be clamped fast to said brace members.

3. A construction as defined in claim 2, further characterized by the fact that said milling machine includes a machine column, and that said support for a horizontal spindle includes a spindle stock which is horizontally displaceable on said column.

4. A construction as defined in claim 3, further characterized by the fact that said vertical spindle head has a lower end at approximately the same elevation as that of said horizontal spindle, and that said brace members, when in their effective positions for stabilizing said vertical spindle head, engage with said vertical spindle head relatively close to said lower end thereof.

5. A construction as defined in claim 4, wherein said brace members are parallel to each other and laterally separated from each other on opposite sides of a vertical plane extending along said horizontal spindle.

No references cited.

WILLIAM W. DYER, JR., *Primary Examiner.*
GERALD A. DOST, *Examiner.*